US009727594B2

(12) United States Patent
Larson et al.

(10) Patent No.: US 9,727,594 B2
(45) Date of Patent: Aug. 8, 2017

(54) ADAPTIVE RANGE FILTERS FOR RANGE AND POINT QUERIES

(71) Applicant: Microsoft Corporation, Redmond, WA (US)

(72) Inventors: Per-Ake Larson, Redmond, WA (US); Donald Kossmann, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 13/738,503

(22) Filed: Jan. 10, 2013

(65) Prior Publication Data
US 2014/0195542 A1    Jul. 10, 2014

(51) Int. Cl.
*G06F 17/30* (2006.01)

(52) U.S. Cl.
CPC .. *G06F 17/30321* (2013.01); *G06F 17/30486* (2013.01)

(58) Field of Classification Search
CPC ................ G06F 17/30321; G06F 17/30486
See application file for complete search history.

(56) References Cited

U.S. PATENT DOCUMENTS

| 7,136,873 B2 | 11/2006 | Smith |  |
| 7,743,013 B2 | 6/2010 | Mityagin et al. |  |
| 8,122,027 B2 | 2/2012 | Young |  |
| 8,502,819 B1 * | 8/2013 | Aila et al. | 345/426 |
| 2006/0294311 A1 * | 12/2006 | Fu et al. | 711/118 |
| 2007/0055658 A1 | 3/2007 | Hsiao |  |
| 2007/0078816 A1 | 4/2007 | Stern |  |
| 2009/0182726 A1 * | 7/2009 | Wang | 707/5 |
| 2011/0208704 A1 * | 8/2011 | Graefe | 707/696 |
| 2012/0197851 A1 | 8/2012 | Leppard |  |
| 2013/0297613 A1 * | 11/2013 | Yu | 707/741 |
| 2013/0318126 A1 * | 11/2013 | Graefe et al. | 707/797 |

OTHER PUBLICATIONS

An, D., S. Park, Access control for energy-efficient query processing, Int'l J. of Comp. Theory and Eng'g, Oct. 2012, pp. 745-750, vol. 4, No. 5.
Bloom, B. H., Space/Time trade-offs in hash coding with allowable errors, Communications of the ACM (CACM), Jul. 1970, pp. 422-426, vol. 13, No. 7.
Koltsidas, I., S. Viglas, Data management over flash memory, Proc. of the ACM SIGMOD Int'l Conf. on Management of Data, SIGMOD 2011, Jun. 12-16, 2011, pp. 1209-1212, Athens, Greece.

* cited by examiner

*Primary Examiner* — Robert Beausoliel, Jr.
*Assistant Examiner* — Hau H Hoang
(74) *Attorney, Agent, or Firm* — Lyon & Harr, LLP; Katrina A. Lyon

(57) ABSTRACT

The technique described herein provides a way to summarize data and can also minimize unnecessary accesses to a data store. In one embodiment, the technique creates and stores an adaptive range filter that contains a compact summary of the contents of an index for a data store in the form of a trie data structure. Before accessing the index of the data store in response to a query, the technique checks the filter to determine whether the data store does not contain any keys for a specific range of data. If the adaptive range filter indicates that the index contains no keys satisfying the query predicate, the index of the data store and the data itself is not accessed. The adaptive range filter of the technique supports both range predicates and equality predicates. It is adaptive to changes in data and queries by learning the query and data distribution.

20 Claims, 10 Drawing Sheets

ADAPTIVE RANGE FILTERS FOR RANGE AND POINT QUERIES

BACKGROUND

Data storage is becoming more and more important in a world that heavily relies on and stores a multitude of kinds of data including spreadsheets, database tables, images, documents, and other types of data to various types of computer-readable media. Sometimes data is stored in the main memory of a computing device, such as in Random Access Memory, while other times data is stored more remotely such as on an external storage device such as, for example, a disk drive, a DVD, a USB key, and the like.

Stored data is typically retrieved using a query entered into a search engine or a database engine in order to retrieve tuples of data from the location where it is stored. The stored data is typically indexed to allow the search or database engine to find the data that satisfies the predicate of the query. Data can be queried as a point query (e.g., the query can specify to return data for a given day), or can be queried over a range (e.g., the query can specify to return data for a range of days).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The adaptive range filtering technique described herein provides a way to summarize data and can also minimize unnecessary accesses to a data store. In one embodiment, the technique stores an adaptive range filter that contains a compact summary of the contents of an index in the form of a trie data structure. Before accessing the index of the data store in response to a query, the technique checks the adaptive range filter. The adaptive range filter can determine whether a set of data does not contain any index keys within a range specified in the query. If the adaptive range filter indicates that the index contains no keys satisfying the query's predicate, there is no need to access the index of the data store or the data itself. Thus an unnecessary access of the data is avoided.

In one embodiment of the technique each node of the trie of the adaptive range filter represents a particular region of a domain of data. For example, the root node represents the whole domain of data indexed. Each parent node in the trie fully contains the regions of its children. The leaves of the trie contain occupied bits indicating whether tuples in the set of data exist in the particular region of data. A query is processed using the trie by inspecting all leaf nodes that overlap with the query. If the occupied bit of one of the leaf nodes is set then the query is processed on the data set represented by the corresponding leaf node, otherwise it is deduced to contain no relevant data for that query.

The adaptive range filter supports both range predicates and equality predicates. In addition to its ability to filter range queries, it is adaptive to changes in data and queries by learning the query and data distribution and adjusting its shape accordingly. Furthermore, the adaptive range filter can be made highly efficient in both space and time.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
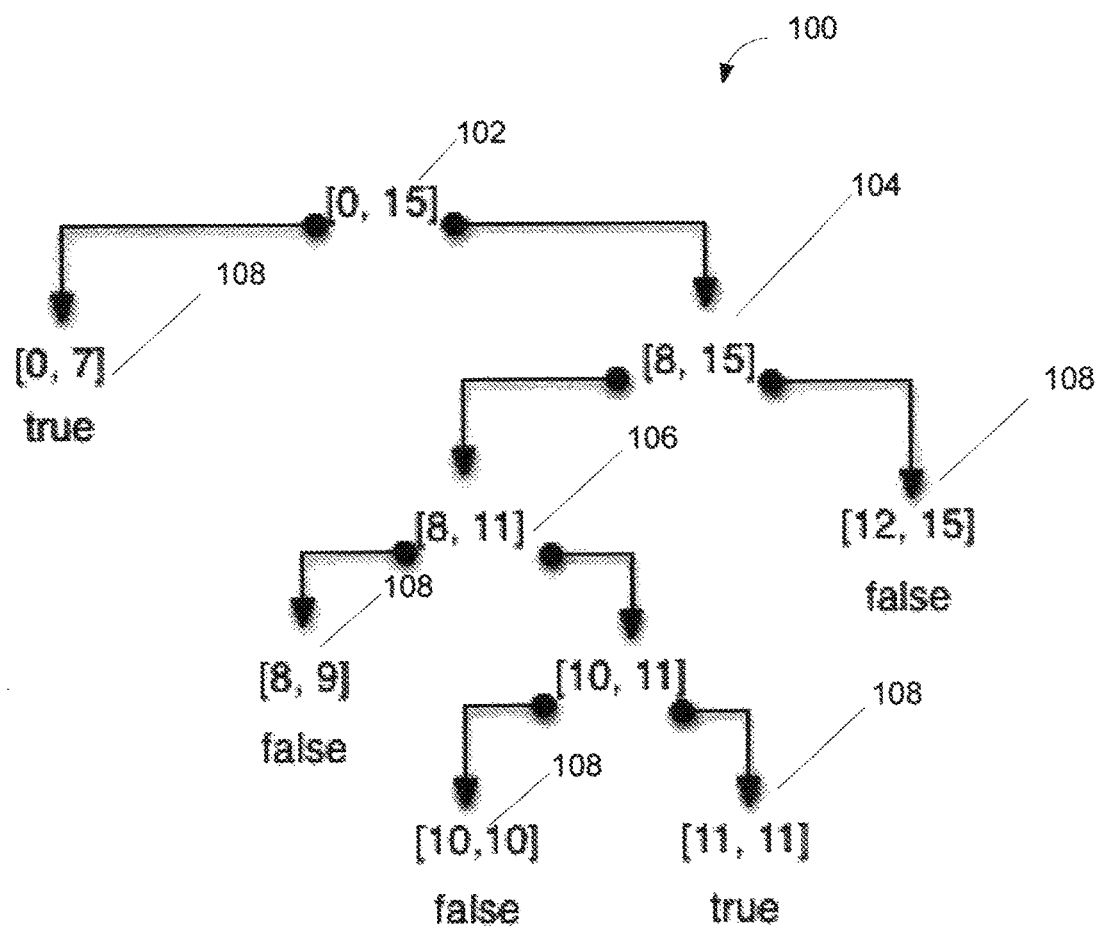
FIG. 1 depicts a schematic of an adaptive range filter according to one embodiment of the adaptive range filtering technique.

In the following description of the adaptive range filtering technique, reference is made to the accompanying drawings, which form a part thereof, and which show by way of illustration examples by which the adaptive range filtering technique described herein may be practiced. It is to be understood that other embodiments may be utilized and structural changes may be made without departing from the scope of the claimed subject matter.

1.0 Adaptive Range Filtering Technique

The following sections provide background information, an overview of the adaptive range filtering technique, as well as exemplary processes and an exemplary architecture for practicing the technique. Details of various embodiments and implementations of the adaptive range filtering technique are also provided.

1.1 Background Information

Some background information on data partitioning and data filtering is provided below to assist in understanding the adaptive range filtering technique described herein.

A database or data store can be partitioned into two parts: (a) a cold set of tuples (e.g., an ordered list of elements) and (b) a hot set of tuples. It is expected that an application (such as, for example, an application that accesses a data store with a query) accesses the tuples of the hot set frequently. As a result, it is affordable to keep the tuples of the hot data set in main memory of a computing device at all times (possibly replicated across machines for high availability) or any other fast and possibly expensive storage device at all times. The cold set of data/tuples is assumed to be much larger and less frequently accessed. Given its size and access frequency, it can be most cost-effective to keep the cold set in a separate (remote) storage system that has lower cost per byte and higher latency (e.g., flash or magnetic disks).

A popular rule of thumb with respect to accessing data states that 80percent of accesses of stored data go to 20 percent of the data. This skew in the access distribution becomes even more pronounced when considering time: Data that is hot (e.g., frequently used) today is likely to be cold (e.g., infrequently used) tomorrow and at any point in time only a small fraction of the data is needed. There are many ways to exploit skew in the access distribution. Caching frequently accessed data in main memory is the most prominent example. Replication of data in a distributed system is another technique that can speed up access to hot data. Partially indexing the hot data is yet another technique that exploits access skew. All of the above techniques have two things in common. First, a greater number of resources and more expensive resources are invested to support access to hot data; e.g., hot data are kept in main memory or additional, fine-grained indexes are built to keep track of hot data. Second, to be fully effective, these methods need to know whether a query involves only hot data or whether access to cold data is needed.

Detecting hot-only queries is straightforward for point queries on the primary key of a relation: If the record can be found in the hot data, then there is no need to go to the cold data. Most caching systems exploit this observation. Furthermore, this task is easy if the query involves an equality predicate (e.g., find all orders that are due today). There are known techniques, such as example, Bloom filters, that indicate whether relevant data might be in the cold data. The more general case of a query with a range predicate (e.g., find all orders that are due within the next week), however, has not been studied so far.

1.2 Overview of the Technique

One embodiment of the adaptive range filtering technique described herein accesses an adaptive range filter that contains a compact summary of the contents of an index before accessing the index and data itself. The technique uses a trie structure to summarize data values contained in a region of data. It encodes the trie structure efficiently and evaluates range predicates over the trie structure. It can construct a minimal trie for known data values and queries and can dynamically update the trie structure based on data insertions and results of queries. It can also use a clock algorithm to select parts of the trie to be reduced.

In computer science a trie structure is an ordered tree data structure that is used to store a dynamic data set or an associative array where the keys are usually strings. No node in the tree stores the key associated with the node, instead, its position in the tree defines the key with which it is associated. Values are normally not associated with every node, only with leaves and some inner nodes that correspond to keys of interest.

One goal, in one embodiment of the adaptive range filtering technique is to determine if it is possible, given a query, for the query to be answered using hot tuples only or whether answering the query requires access to cold tuples. In many cases, the decision whether a tuple is hot or cold will be based on a predicate. In some cases it can be determined at compile-time whether a query involves only hot data. In general, however, one does not want to constrain the way in which the data is partitioned into hot and cold sets. For instance, one would like to support partitioning techniques that place tuples into the hot and cold pool based on their actual access frequency. Furthermore, one would like to be able to answer any kind of query that involves any kind of predicate, including predicates on attributes that may be irrelevant for the decision of whether a tuple is hot or cold. Therefore, in the general case, the decision of whether a query involves cold data needs to be carried out at run time and cannot be done by looking at the query text and the partitioning scheme only.

A design of an adaptive range filter 100 according to the technique is shown in FIG. 1. Each node of the trie of the adaptive range filter represents a particular region of a domain of data. For example, the root node 102 represents the whole domain of data indexed, while each parent node (e.g., 104) fully contains the regions of its children (e.g., 106). The leaves 108 of the trie contain occupied bits indicating whether tuples in the set of data exist in the particular region of data. A query is processed using the trie by inspecting all leaf nodes that overlap with the query. If the occupied bit of one of the leaf nodes is set then the query is processed on the data set represented by the corresponding leaf node, otherwise the data set is deduced to contain no relevant data for that query.

Figure 2:
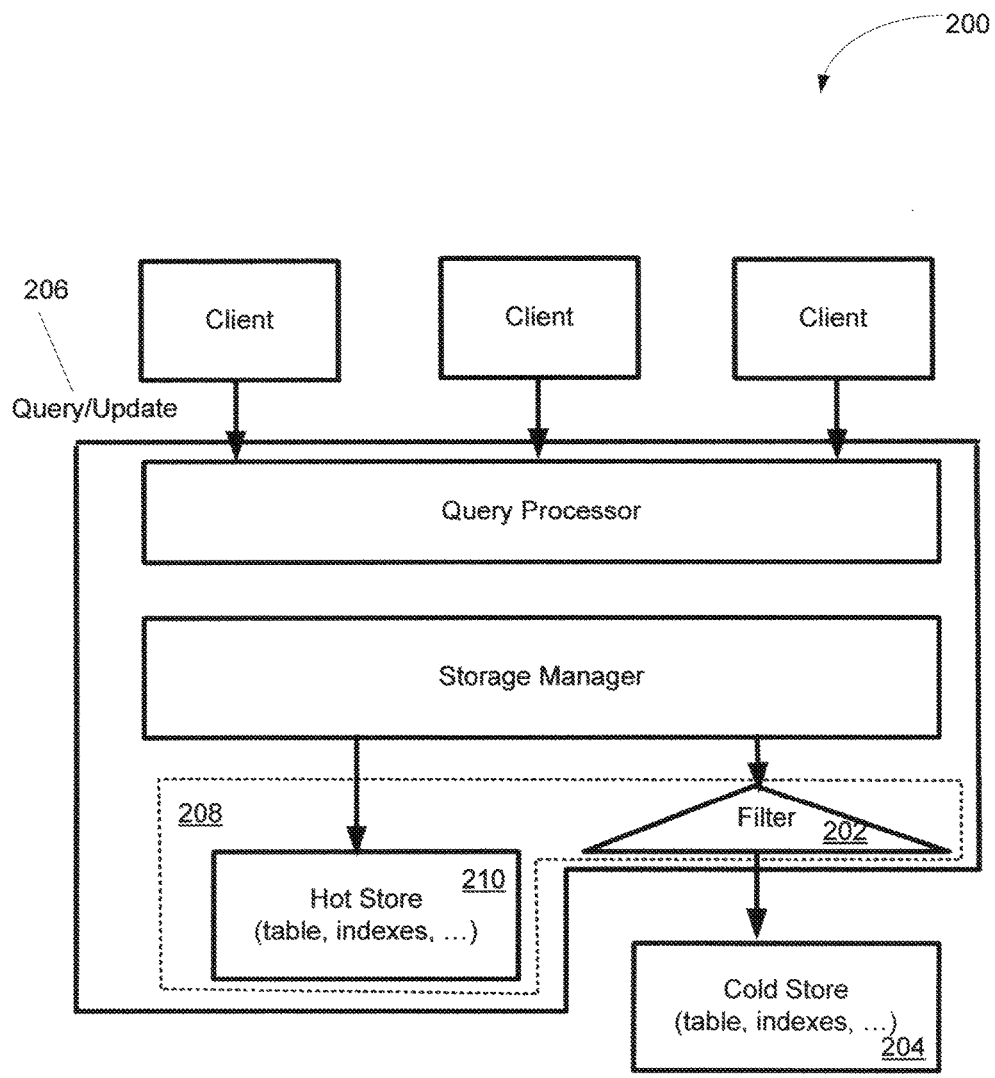
FIG. 2 depicts an exemplary schematic of one implementation of the adaptive range filtering technique wherein an adaptive filter and frequently used data is stored in the main memory of a computing device.

FIG. 2 depicts an exemplary schematic 200 of the adaptive range filtering technique where an adaptive range filter 202, as discussed above with respect to FIG. 1, is used to determine if data 204 (e.g., data in the cold data store) needs to be accessed or not in response to a query 206. In this embodiment, the adaptive range filter 202 (which can be, but does not have to be, stored in main memory 208 along with the hot data store 210) tries to prevent unnecessary accesses to a data store (e.g., the cold store 204). Access to the (cold) store 204 is assumed to be expensive even if it is only to find out that the store contains no relevant information for a query or update operation. Given a query 206, the filter 202 returns true if the cold store 204 possibly contains records that match the query. It returns false if the cold store 204 is guaranteed to contain no relevant information for the query 206. In this case (the most frequent case), the query 206 can be processed on the hot store 210 without accessing the cold store 204.

There are a number of different partitioning techniques that decide which data to place into the hot store 210 and which data to place into the cold store 204. Some of these techniques involve hints from system administrators (e.g., place all orders with status="shipped" into the cold store). Some of these techniques are fully automatic and monitor the access frequency of records. Partitioning of the database is transparent to the developer who writes queries and updates. Furthermore, the partitioning can change at any point in time. For example, there might be a continuous migration of records between the hot and cold stores, making it preferable to employ adaptive techniques. Bloom filters, for instance, are not adaptive and their precision deteriorates when many records have migrated between the hot and cold stores. Overall, in general, filters used for minimizing unnecessary access to data and minimizing storage requirements should ideally fulfill the following requirements:

1) Correctness: The filter should not generate false negatives. That is, if the filter returns false for a query or data update, then it should be certain that the cold store contains no relevant records.

2) Precision: The number of false positives should be minimized. A false positive is a query or update for which the filter returns true even though the cold store contains no relevant records. False positives do not jeopardize the correctness of the query results, but they hurt performance.

3) Space efficiency: The filter should ideally be located in the hot store to guarantee efficient access to the filter. As space in the hot store is expensive, minimizing the space occupied by the filter is critical to be cost effective.

4) Graceful degradation: A direct consequence of the space efficiency requirement is that the precision of a filter should grow and degrade with its space budget. Even a tiny filter should be useful and filter out the most common queries.

5) Speed: Filtering is preferably much faster than access to the cold store. The cost of filtering ideally is in the same order as processing a query in the hot store: Most queries are expected to be hot only queries and almost all queries (except for primary key lookups in the hot store) involve a filtering step. That is why the filter ideally lives in the hot store.

6) Robustness: By design, most queries and updates involve hot data only. Therefore typically both the data distribution and the query distribution are heavily skewed. The filter should be designed to work well in such situations. Furthermore, the filter preferably adapts whenever the workload changes and/or data is migrated back and forth from the cold to the hot data store.

7) Generality: The filter preferably should not make any assumptions about the partitioning scheme used to classify records as hot or cold. It should support partitioning at the record level, the finest possible granularity. Furthermore, the filter should support any kind of query and update: that is, both equality and range predicates.

One classic way to implement filters for point queries is to use Bloom filters. A Bloom filter is a known space efficient probabilistic data structure that is used to test whether an element is a member of a set. Bloom filters are correct, precise, space efficient, fast, and degrade gracefully. Some techniques use Bloom filters for attributes that are mostly accessed with equality predicates (i.e., point queries and updates). Unfortunately, Bloom filters are not a good match for range queries. They violate the Generality requirement discussed above. Furthermore, they do not exploit skew in the data and workload and do not adapt to changes in the data and workload. Bloom filters, thus, also violate the Robustness requirement.

A general overview of the adaptive range filter technique having been provided, the following section provides a description of exemplary processes for practicing the adaptive range filtering technique.

1.3 Exemplary Processes

Figure 3:
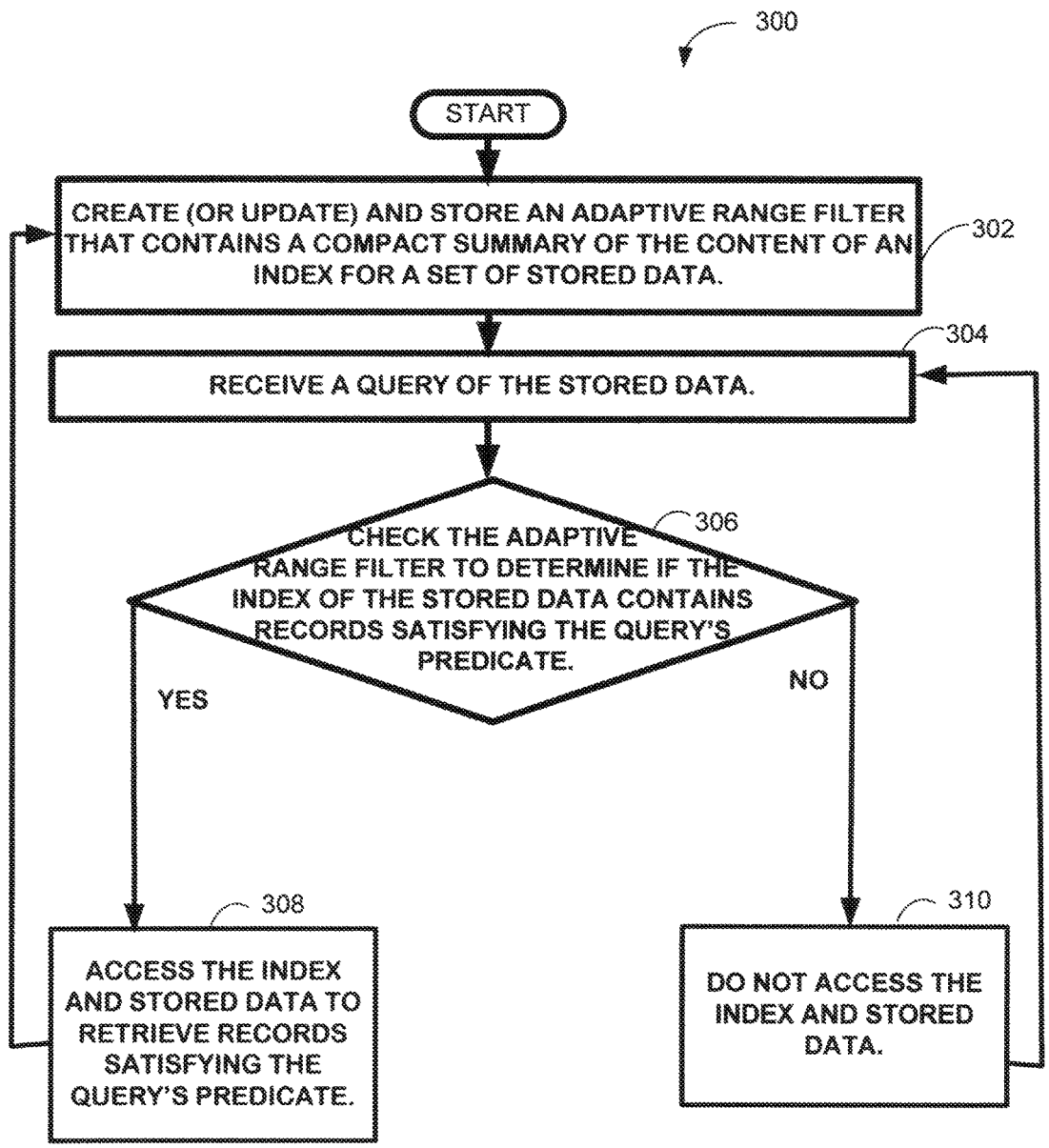
FIG. 3 depicts a flow diagram of one exemplary process for practicing the adaptive range filtering technique.

FIG. 3 depicts an exemplary process 300 for accessing stored data according to the adaptive range filtering technique. A trie-structured adaptive range filter is created that contains a compact summary of the contents of an index for set of data (block 302). Each node of the trie represents a particular region of a domain and the root node represents the whole domain that is to be indexed. A parent node fully contains the regions of its children in the trie and leaves of the trie contain occupied bits indicating whether tuples in the cold set of data exist in that particular region. A query can be input (block 304) and a check of the adaptive range filter is made to determine if the index of the stored data contains records satisfying the query's predicate (block 306). To do this the query is processed using the trie-based adaptive range filter by inspecting all leaf nodes that overlap with the query. If the occupied bit of one of the leaf nodes is set then the query searches the data set (block 308), otherwise it is deduced that the data set contains no relevant data for the query and the data set is not examined (block 310).

Figure 4:
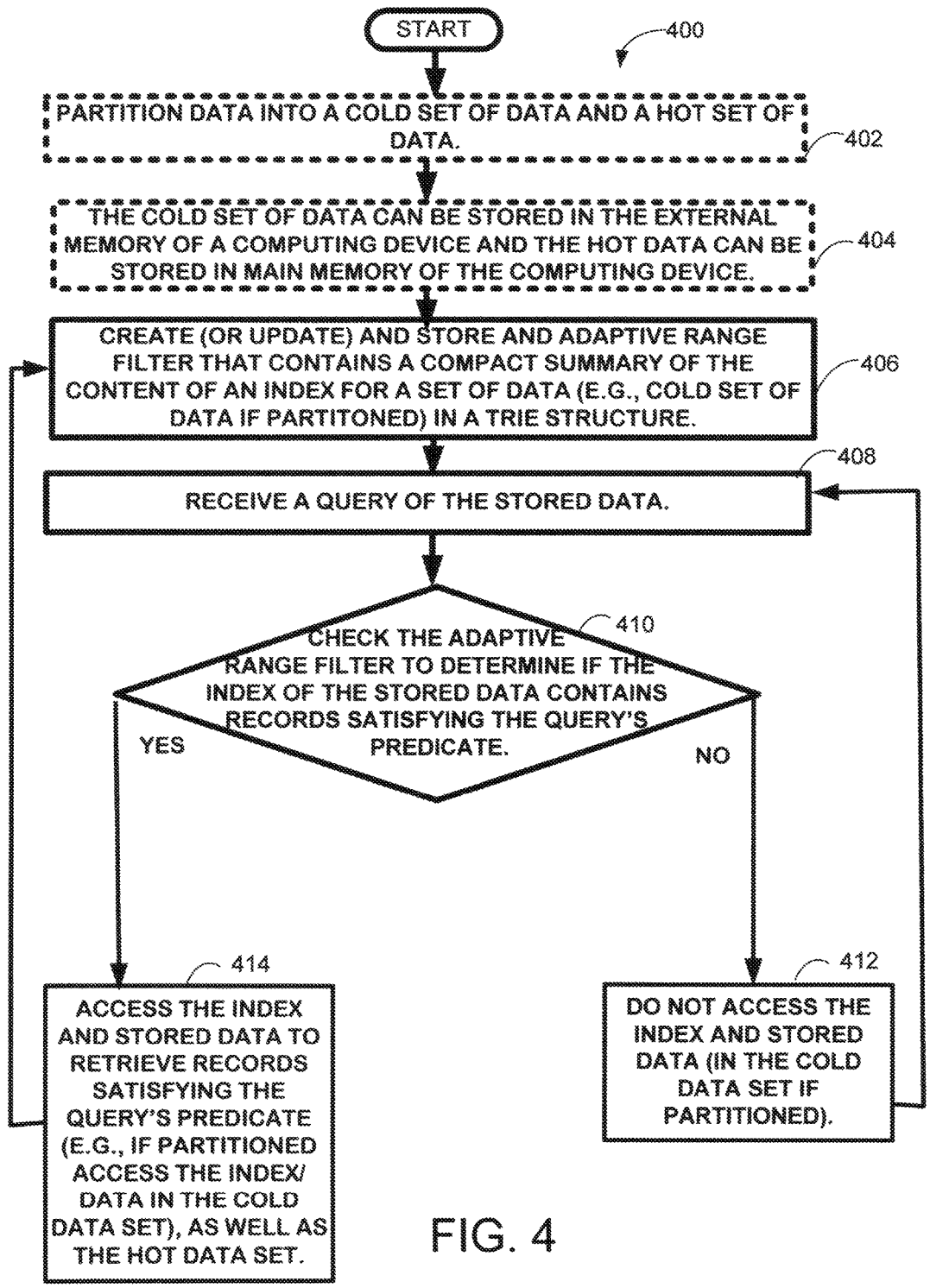
FIG. 4 depicts a flow diagram of another exemplary process for practicing the adaptive range filtering technique.

FIG. 4 depicts another exemplary computer-implemented process 400 of the technique that efficiently accesses stored data, some of which is frequently accessed and some of which in infrequently accessed. As shown in block 402, the data can be partitioned into a cold set of data that is infrequently accessed and a hot set of data that is frequently accessed. The cold set of data can be stored in external memory of a computing device (block 404), while the hot set of data can be stored in main memory of the computing device (block 404). An adaptive range filter that contains a compact summary of the contents (in a trie format) of an index for a set of data (e.g., the external index for the cold set of data if the data is partitioned) is created (block 406). A query of the stored data is received (block 408) and the adaptive range filter is checked to determine if the index contains records satisfying a predicate of the query (block 410). If the adaptive range filter indicates that the index contains no records satisfying the query predicate, the index and the data (e.g., the cold set of data if partitioned) are not accessed (block 412). If the adaptive range filter indicates that the index contains records satisfying the query predicate, the index and the data (e.g., the cold set of data if partitioned) is accessed to retrieve data satisfying the query predicate. The set of hot data is also accessed to retrieve data satisfying the query predicate (block 414).

Exemplary processes for practicing the adaptive range filtering technique having been described, the following section discusses an exemplary architecture for practicing the adaptive range filtering technique.

1.4 Exemplary Architecture

Figure 5:
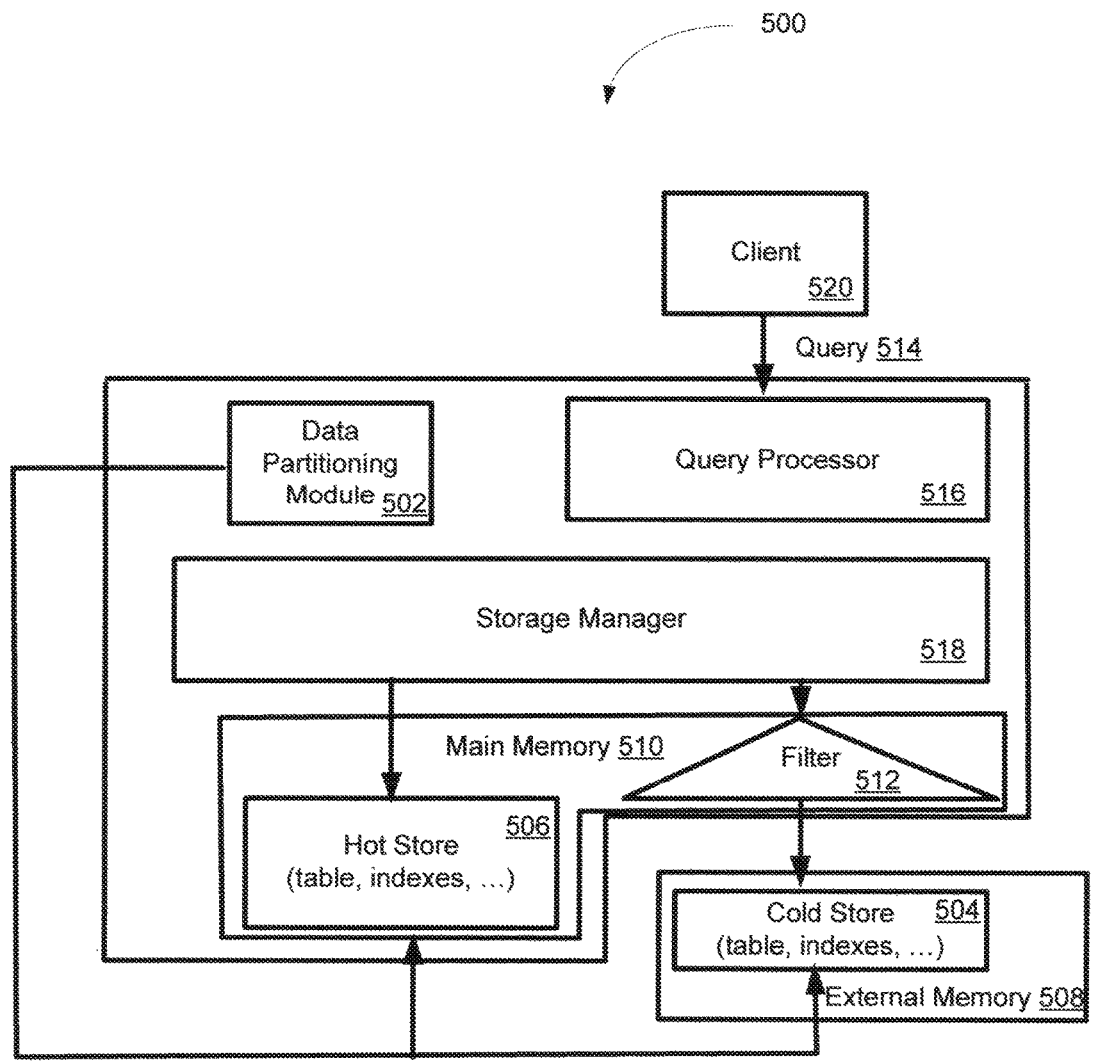
FIG. 5 is an exemplary architecture for practicing one exemplary embodiment of the adaptive range filtering technique described herein.

FIG. 5 shows an exemplary architecture 500 for practicing one embodiment of the adaptive range filtering technique FIG. 5. The architecture 500 includes an adaptive range filter 512, a query processor 516 and a storage manager 518 that all reside on a general purpose computing device 1000, which will be discussed in greater detail with respect to FIG. 10. The storage manager 518 is responsible for storing data in the hot store and the cold store and for retrieving records that satisfy a given range or point query. The query processor 516 performs any required additional processing required to complete the user query, for example, computing aggregates over the records retrieved by the storage manager 518. In this embodiment data is partitioned in a data partitioning module 502 into a cold set of data 504 that is infrequently accessed and a hot set of data 506 that is frequently accessed. The cold set of data 504 is stored in external memory 508 of the general purpose computing device 1000, while the hot data 506 is stored in the main memory 510 of the computing device along with the adaptive range filter 512 that contains a compact summary of the contents of an external index for the cold set of data 504. Furthermore, the adaptive range filter 512 is a trie-structured filter, such as was previously discussed with respect to FIG. 1. Each node of the trie represents a particular region of a domain and the root node represents the whole domain that is to be indexed. A parent node fully contains the regions of its children in the trie and leaves of the trie contain occupied bits indicating whether tuples in the cold set of data exist in that particular region. A query 514 is input (for example, from the client 520) and the query is processed using the trie-based adaptive range filter 512 by inspecting all leaf nodes that overlap with the query. If the occupied bit of one of the leaf nodes is set then the query 514 searches the cold data set 504 for data matching the predicate of the query, otherwise it is deduced that the cold data set 504 contains no relevant data for the query and the cold data set is not examined. In this embodiment of the technique the hot data store is always examined.

The next section provides more details on various aspects of adaptive range filters.

2.0 Adaptive Range Filters

This section describes how an adaptive range filter filters range queries, how it is implemented in a space-efficient way, and how it is integrated into an index implemented as a B-tree (e.g., in a hot data store). Additionally, a discussion of how adaptive range filters can adapt to skew in the data and query distribution is provided.

2.1 Overview of an Exemplary Adaptive Range Filter

Figure 6:
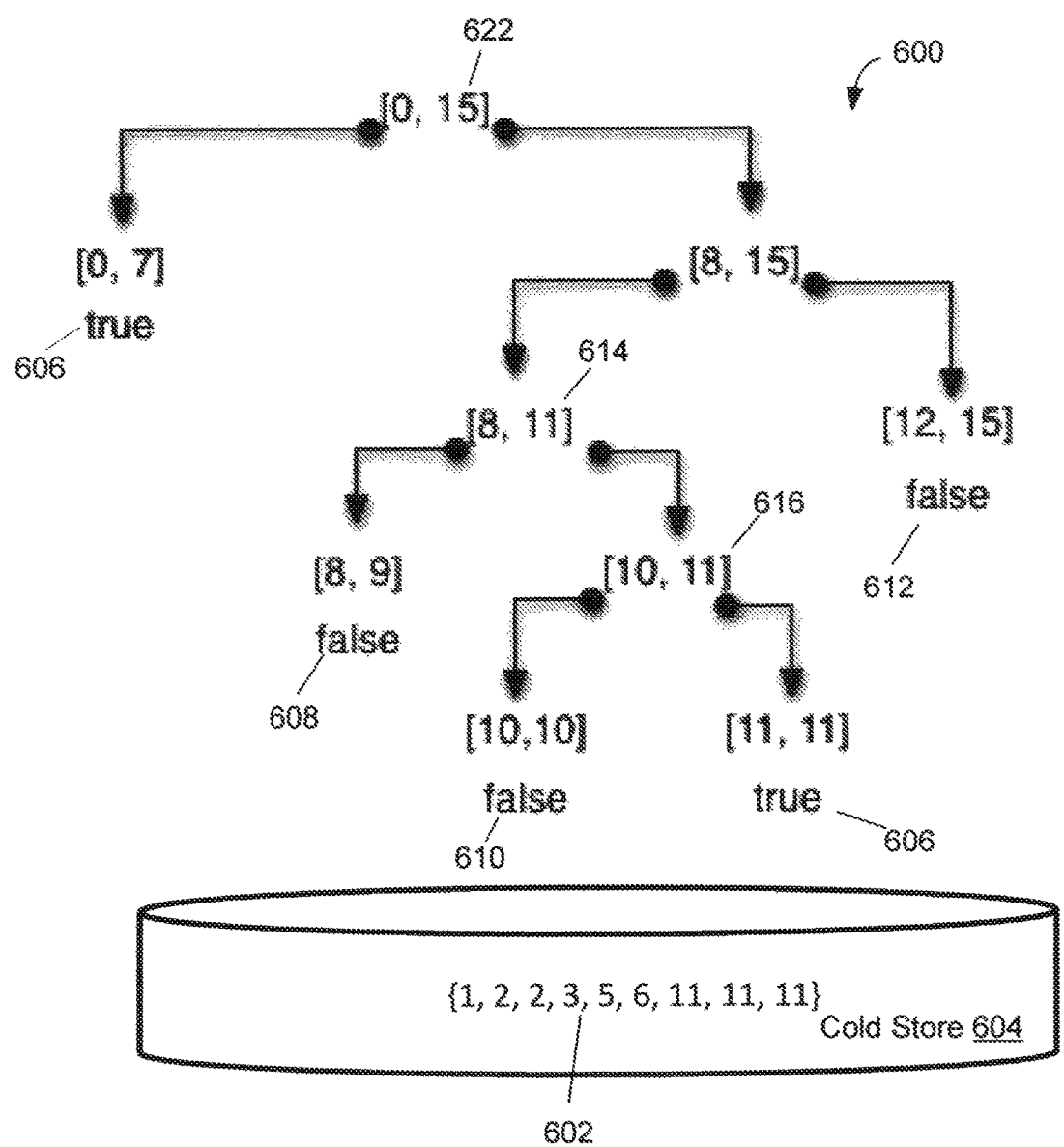
FIG. 6 depicts an example of an adaptive range filter.

FIG. 6 provides an example of an adaptive range filter configuration. It shows the keys of records 602 stored in a cold store 604 (e.g., shipping dates of orders) and one possible adaptive range filter 600 built for this bag of keys 602. In most workloads associated with querying or updating the data, several indexes and adaptive range filters are constructed for a data table: one for each attribute that is frequently involved in predicates of queries and data updates.

An adaptive range filter can be thought of as a binary tree whose leaves represent ranges and indicate whether or not the data store contains any records whose keys match that range. To this end, each leaf node keeps an occupied bit (e.g., 608). The adaptive range filter 600 of FIG. 6, for instance, indicates that the cold data store 604 has records with keys in the ranges [0,7] and [11,11]: the occupied bits 606 of these two leaves are set to true. Furthermore, the adaptive range filter 600 of FIG. 6 indicates that the cold data store 604 has no records with keys in the ranges [8,9], [10,10], and [12,15]: the occupied bits of these three leaves (608, 610, 612) are set to false.

The intermediate nodes of an adaptive range filter help to navigate the adaptive range filter in order to find the right leaves for a given query. Each intermediate node (e.g., 614, 616) represents a range and has two children: The left child represents the left half of the range of its parent; the right child 620 represents the right half of the range. The root 622 represents the whole domain of the indexed attribute (e.g., [0,15] in example of FIG. 6). Using an adaptive range filter, a range query, [l,r] is processed as follows: Starting at the root 622, the technique navigates to the leaf node that contains l, the left boundary of the range query. If the occupied bit of that leaf is set to true, the filter returns true, thereby indicating that the cold store needs to be accessed for this query. If the occupied bit of that leaf is set to false, then the right sibling of that leaf is inspected until the leaf covering r has been inspected. For instance, the range query [8,12] would navigate first to the leaf [8,9], then visit the leaf [10,10] and then [11,11]. At this point, it would return true indicating that the cold store needs to be visited.

Revisiting the requirements for filters listed previously, the adaptive range filter structure is correct if the occupied bit of a leaf is set to false only if the cold store indeed contains no records whose keys match the range of that leaf. Therefore, the occupied bits need to be maintained whenever new records are migrated to the cold store or records are updated in the cold store. False positives may arise in a number of situations: Most importantly, an adaptive range filter cannot precisely represent all the keys of the cold store if there is a limited space budget. For instance, the adaptive range filter of FIG. 6 does not capture the fact that the cold store contains no record for 4 because doing so would require the adaptive range filter to grow much deeper. As a result, the adaptive range filter of FIG. 6 results in a false positive for the query [4,4].

2.2 Encoding

One of the main advantages of the adaptive range filter structure is that it can be implemented in a space-efficient way. Because the children of every node always partition a region in half, the nodes need not store the delimiters of their ranges: These ranges are implicit. More precisely, an adaptive range filter is a trie and every level of the trie represents information for the next significant "bit" of the domain. So, all that is needed to represent an adaptive range filter is to encode the whole domain, the shape of the tree, and the occupied bits of the leaves.

Every intermediate (non-leaf) node can be represented using two bits. These two bits encode whether the node has 0, 1, or two children. In other words, the following four situations can arise:

00: Both of the children of the intermediate node are leaves. For instance, Node [10, 11] in FIG. 6 is represented by this bit sequence.

01: The left child is a leaf; the right child is not a leaf. For instance, Nodes [0, 15] and [8, 11] in. FIG. 6 are encoded in this way.

10: The right child is a leaf; the left child is not a leaf. For instance, Node [8, 15] in FIG. 2 is encoded in this way.

11: None of the children are leaves. (This case is not shown in FIG. 6.)

A whole adaptive range filter can be serialized by serializing each node in a breadth first traversal. For instance, the (shape of the) adaptive range filter of FIG. 6 could be represented by the following bit sequence (the first 01 encodes the root, the 10 encodes Node [8, 15], and so on): 01100100

Note that no pointers are needed: This bit sequence is all that is needed to determine both the shape and the ranges of all nodes of the adaptive range filter of FIG. 6. In addition to the bit sequence that encodes the intermediate nodes and, thus, the shape of the adaptive range filter, the technique maintains the occupied bits of the leaves. Continuing the example of FIG. 6, the bit sequence that represents the five leaves is:

10001

The first 1 represents the true for the occupied bit of Leaf [0, 7], the following 0 represents the false for [8, 10], and so on. Note that the ordering of the leaves is determined by the order in which they are visited during a breadth first traversal.

The adaptive range filter of FIG. 6 can be represented using 13 bits, consisting of the 8 bits encoding the shape and the 6 bits for the leaves. In general, an adaptive range filter with n nodes is encoded using 1.5*n bits: 2*n/2 bits for the intermediate nodes plus n/2+1 bits for the leaves. In addition, one needs to maintain the domain; i.e., the range covered by the root node. This range can be stored as part of a separate B-tree in the hot store which needs to store such ranges anyway.

In some embodiments of the technique, a breadth-first encoding (as opposed to depth-first) of the adaptive range filter is used because it supports a more efficient navigation through the adaptive range filter. In particular, navigating to the right sibling of a leaf, which is needed to filter large range queries that cover multiple leaves, is implemented by advancing to the next bit in the bit sequence that represents the adaptive range filter.

2.3 Adaptive Range Filter Forests

In practice, many small adaptive range filters that each cover a specific sub-range, instead of one big adaptive range filter that covers the whole domain, are used. One reason for this is that adaptive range filters can be nicely embedded into existing index structures such as, for example, B-trees. Another reason is improved lookup performance and space efficiency.

Figure 7:
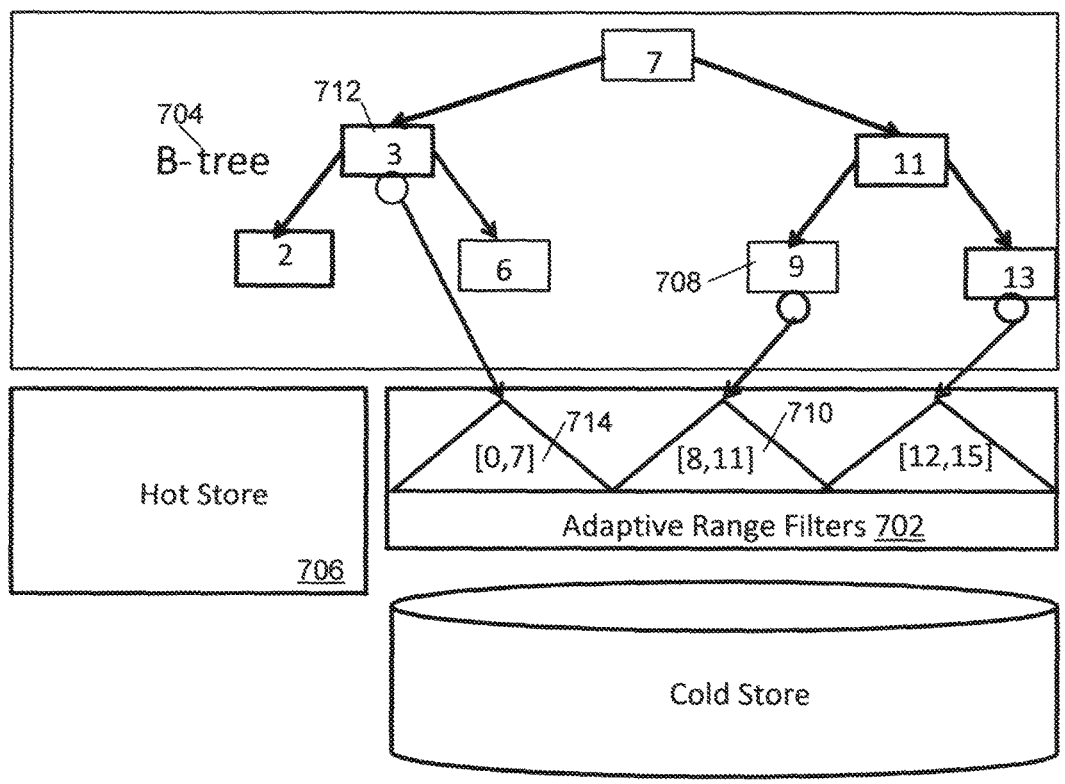
FIG. 7 depicts an exemplary adaptive range filter integrated into a B-tree structure.

FIG. 7 shows how adaptive range filters 702 can be embedded into a B-tree 704 (e.g., in the hot store 706). The upper part of FIG. 7 shows a normal, traditional B-tree 704 which indexes the data in the hot store 706. For simplicity, this example B-tree is shown as having only one entry in each node. To find data in the hot store, the technique navigates this B-tree just like any other B-tree.

What makes the B-tree of FIG. 7 special is that any node (leaves and intermediate nodes) can include a reference to an adaptive range filter. For instance, the leaf node 708 of the B-tree that contains the Key 9 has a reference to the adaptive range filter that corresponds to the Range [8,11] 710. Likewise, the intermediate node of the B-tree with the marker 3 712 points to the adaptive range filter 714 that corresponds to the Range [0,7]. Processing a query now involves navigating the B-tree to find all relevant hot records and following the pointers to adaptive range filters in order to find out whether it is necessary to access the cold store.

Comparing FIGS. 6 and 7, one way to interpret the forest of adaptive range filters 702 is to think of a big adaptive range filter with several nodes at its top chopped off. For instance, the forest of adaptive range filters 702 depicted in FIG. 7 emerged from the big adaptive range filter of FIG. 6 by removing nodes [0,15] and [8,15] and connecting the resulting three subtrees to the appropriate places in the B-tree. There are three reasons why doing so improves space and time:

1) Space: The root node of the adaptive range filter need not store the boundaries of the range it represents. These boundaries are implicitly stored in the B-tree.

2) Space: The technique saves the bits to encode the upper levels of the big adaptive range. For instance, the four bits to represent nodes [0,15] and [8,15] in the big adaptive range filter of FIG. 6 are not needed and the three adaptive range filters of FIG. 6 can be represented with a total of 9 bits (instead of 13 bits).

3) Time: The technique saves the cost to navigate the first levels of the adaptive range filter. In other words, while traversing the B-tree, the technique implicitly also navigates through the top levels of the adaptive range filter.

2.4. Learning and Adaptation

One of the important features of the adaptive range filter structure is that it can adapt to the data and query distribution. For instance, large regions that contain no data such as [12,15] in FIG. 6 can be represented in a compact way. Likewise, large regions that are densely packed such as [0,7] in FIG. 6 can also be represented in a compact way. In this way, an adaptive range filter can invest most of its bits into regions that are queried frequently and are modestly populated such as [8,11] in FIG. 6.

This section describes how to construct and evolve an adaptive range filter, thereby adapting to the data and query distribution and to data movement from and to the cold store. First, the basic primitives of splitting and merging nodes of an adaptive range filter are described. Then, specific adaptation and learning techniques are presented. Throughout this section, examples for a "single big adaptive range filter" approach are shown. All the techniques apply to a forest of adaptive range filters.

2.4.1 Escalation (Split)

Figure 8A:
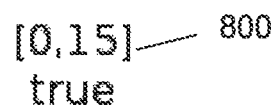
FIG. 8A depicts an adaptive range filter before escalation (e.g., splitting nodes in a trie structure).
Figure 8B:
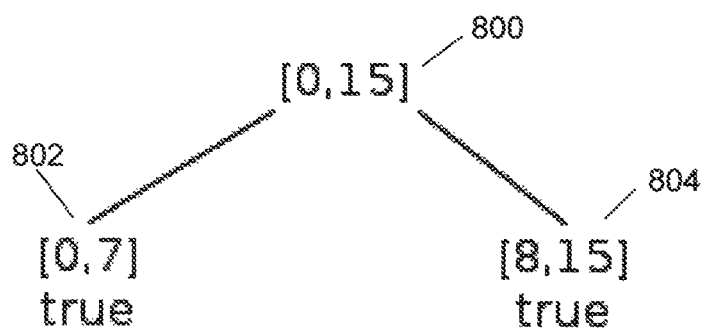
FIG. 8B depicts an adaptive range filter after split of a node.
Figure 8C:
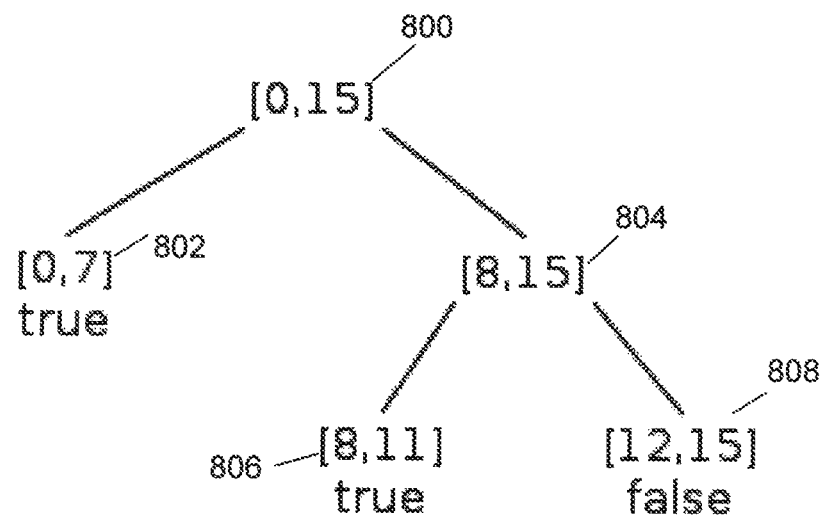
FIG. 8C depicts the complete escalation of a node.

Technically, an adaptive range filter grows and shrinks just like any other tree: It grows by splitting leaves and it shrinks by merging leaves. FIGS. 8A and 8B show how the adaptive range filter of FIG. 6 could have evolved. At the beginning, an adaptive range filter just contains a single node that represents the whole range and indicates that the cold store needs to be accessed for every query or update operation. FIG. 8A shows this minimal adaptive range filter 800 for the example of FIG. 6. FIG. 8B shows the next incarnation created by splitting this single node 800 into two nodes 802, 804. Again, in this embodiment a split always partitions the range of its parents in half. FIG. 8C shows the resulting adaptive range filter after splitting Node [8,15] into two nodes 806, 808.

Unlike most other trees, splitting (and merging) of nodes is not initiated by updates to the databases. B-tree nodes, for instance, are split as a result of inserting a new key. In contrast, an adaptive range filter grows (and shrinks) as a result of learning and adapting to the data and query distribution. The sequence of splits shown in FIGS. 8A, 8B, 8C, for instance, could have been induced by processing the range query [12,15]. Concretely, this range query is processed as follows:

- The starting point is the adaptive range filter of FIG. 8A. Probing the range query [12,15] results in true.
- The query is processed on the cold store. The result is empty.
- At this point, it is known that [12,15] is a false positive and the adaptive range filter of FIG. 8A is not accurate. To improve precision, the adaptive range filter is grown so that the resulting adaptive range filter reflects what was learned; i.e., correctly shows that the cold store contains no data for keys in the region [12,15]. This is called escalation.
- Escalation is carried out recursively: The technique splits the relevant leaf node until leaves are created that are either fully contained or disjoint with the false positive query. In this example, two steps of this recursion are carried out:

First, Node [0,15] is split, then Node [8,15] is split. At this point, only leaf nodes that are disjoint with the query (i.e., [0,7] and [8,11]) or are fully contained in the query (i.e., [12,15]) exist.

- The technique sets the occupied bits of all leaves that are contained by the query to false, indicating that the cold store has no data that matches these regions. In this example, the occupied bit of [12,15] is to false. The occupied bits of the other leaves are initialized to true because no other information is available and the technique must be conservative and avoid false negatives for correctness.

Again, the goal of this escalation process is to improve the precision of an adaptive range filter and reduce the number of false positives in the future. Putting it differently, the technique tries to avoid making the same mistake twice. Escalation requires additional space. If space is limited, then the technique needs to de-escalate the adaptive range filter, thereby gaining space and losing precision. The next subsection describes this process.

2.4.2 De-Escalation (Merge)

One goal of the technique is to minimize the number of false positives with a given (small) space budget. If the goal were perfection, then the adaptive range filter would grow and grow in size. In the worst case, the adaptive range filter can become as large as the cold store.

However, perfection is not necessary and the technique can often achieve very good results (few false positives) by exploiting skew in the workload associated with querying or updating the stored data. It is expected that the workload is skewed in such a way that most queries and updates hit the same region; e.g., orders that are due today. The idea is to exploit this skew in the same way as a cache exploits skew: keeping statistics and using these statistics as part of a replacement policy.

Figure 9A:
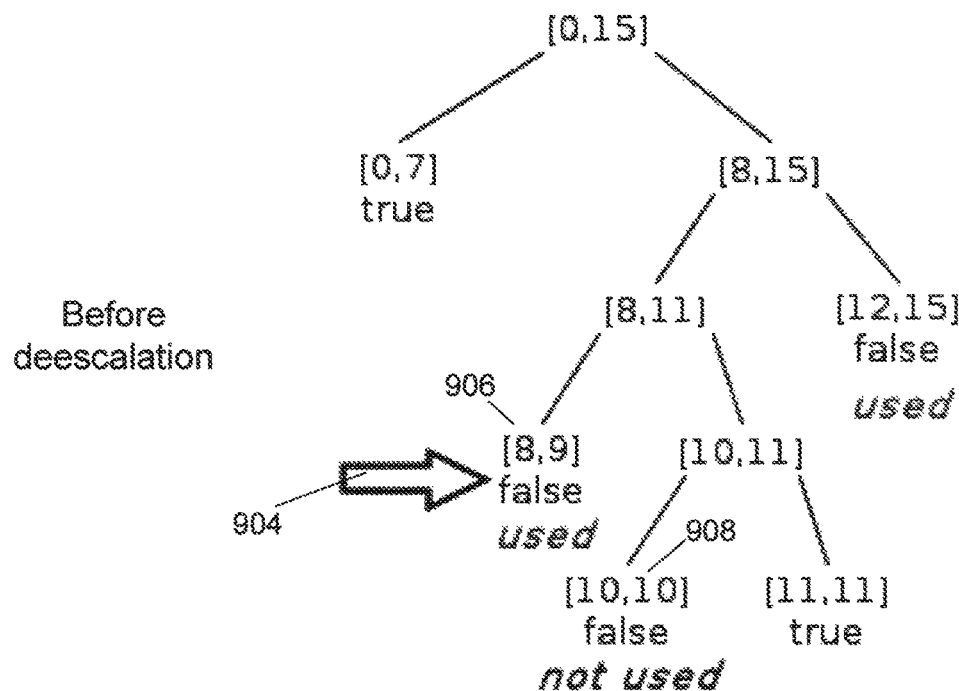
FIG. 9A depicts adaptive range filter replacement before de-escalation (e.g., merging nodes of the trie structure).
Figure 9B:
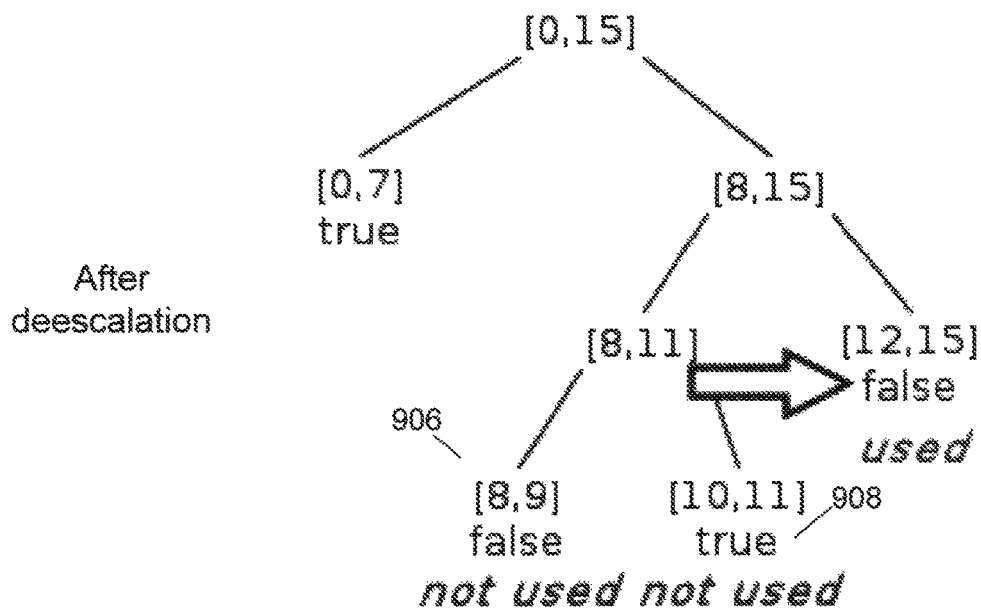
FIG. 9B depicts adaptive range filter replacement after de-escalation.

FIGS. 9A and 9B demonstrate this principle using the running example and a clock replacement policy. Using a clock policy is suggested in one embodiment because its statistics are small (i.e., a single bit as opposed to 64 bits for a pointer). FIG. 9A shows the example adaptive range filter from FIG. 6; this time with a used bit for each leaf node. The used bit of a leaf is set whenever a query hits that leaf. For instance, the processing of Query [13,14] sets the used bit of Leaf [12,15], thereby indicating that this leaf is useful and not a good candidate for replacement. Furthermore, FIG. 9A shows the clock pointer 904 which points to Leaf [8,9] 906 in this example. If the adaptive range filter has grown beyond its space budget, then the replacement policy looks for a victim. In this example, the clock strategy first checks Leaf [8,9]: Since its used bit is set, the clock strategy advances the clock pointer to the next leaf ([10,10] in this example) and unsets the used bit of [8,9], the leaf that it just visited. In this example, the clock replacement policy selects [10,10] 908 as a victim because its used bit is not set.

FIG. 9B shows the adaptive range filter after replacing [10,10]. Technically, such a de-escalation works by merging the victim with its sibling—[11,11] in this example. Actually, it is only possible to de-escalate if the sibling is also a leaf: If not, the clock strategy continues to look for victims until two leaves can be found.

Merges cascade if the occupied bits of two leaves have the same value. In general, two sibling leaf nodes that have their occupied bits set to the same value do not carry any information so that they can be merged. In the example of FIG. 9B, Nodes [8,9] 906 and [10,11] 908 have different values for their occupied bits so that the merge cascade stops at this point. If the occupied bit of Node [8,9] 906 had been set to true, then these two nodes would have been merged, too.

An interesting observation is that used bits (or more generally, usage statistics for a replacement policy) are only needed for leaf nodes whose occupied bits are set to false. Only these leaves carry useful information and only these leaves need to be protected from replacement. Putting it differently, it never hurts to merge a leaf with occupied bit set to true with its sibling if that sibling is not useful for any queries. By applying the replacement policy only to leaves whose occupied bit is set to false, half of the space for keeping usage statistics is saved. Again, space economy is also the reason using a clock strategy as a replacement policy is suggested. Overall, on average, only half a bit per leaf node is required.

2.4.3 Speeding-Up Learning

The previous discussion showed how an adaptive range filter learns from false positive queries: It escalates, thereby making sure that it does not make the same mistake twice. In fact, the adaptive range filter can also learn from true positive queries; true positives are queries for which the adaptive range filter indicated that the cold store needs to be accessed (the occupied bit of one of the relevant leaves was set to true) and for which indeed the cold store returned a non-empty result. The results of these queries are useful to train the adaptive range filter because it can be inferred that the gaps between two results are empty.

To give an example, let the result of Query [5,15] be: 7 and 9. If the query involves no other predicates on other dimensions, it can be inferred that the cold store has no records that match keys in the ranges [5,6], [8,8] and [10,15]. Correspondingly, the technique could set the occupied bit of a leaf node, say, [12,15] to false if it is still set to true from its initialization because no other information was available at that point in time.

Learning from such true positives speeds up learning dramatically and comes at virtually no cost. Another way to speed up learning at little incremental cost is to ask slightly bigger queries to the cold store whenever the cold store is visited. For instance, if the query is [13,14] and the relevant leaf node of the adaptive range filter is [12,15] and its occupied bit is set to true from its initialization, then the technique could forward the query [12,15] to the cold store and filter the results returned by the cold store. The reason is that if [13,14] is a false positive and, actually, the whole range [12,15] is empty, then it is not necessary to escalate the adaptive range filter to process this false positive. And, even if [12,15] is not entirely empty, then the technique possibly would not have to escalate the sub-tree rooted in [12,15] as deeply as one would have to if one only knew that [13,14] was empty.

2.4.4 Updates

In general, if a record is moved from the hot store into the cold store, then all adaptive range filters constructed for the table of that record need to be updated in order to avoid false negatives. In FIG. 6, for instance, the occupied bit for Node [12,15] must be set to true, if, say, a record with key 14 is inserted into the cold store. Actually, there are several alternative approaches to avoid false negatives in this situation; e.g., escalating Node [12,15] or conditionally escalating Node [12,15] if its used bit is set.

If a record is removed from the cold store, the adaptive range filter is not changed. In FIG. 6, for instance, one cannot set the occupied bit of Node 5 [11,11] to false, even if one knew that one or several records with key 11 have been removed from the cold store. Fortunately, unlike insertions, deletions in the cold store cannot result in incorrect adaptive range filters: the worst that can happen is that they result in inefficiencies caused by false positives. The escalation mechanism that adapts an adaptive range filter after a false positive is quite effective so that an adaptive range filter adjusts quickly to changes in the data distribution caused by excessive migration of records between the hot and cold store. In fact, this fine-grained re-adaptation is one of the key advantages of adaptive range filter s as compared to Bloom filters. The only way a Bloom filter can adjust to such migrations is to completely reconstruct the Bloom filter: This reconstruction involves a complete scan of the data in the cold store.

2.4.5 Training Adaptive Range Filters

In addition to its ability to adapt to changes in the data distribution in a fine-grained way, one main advantage of adaptive range filters over Bloom filters is that they learn on the fly: It is always safe to start with a trivial adaptive range filter with only one node such as the adaptive range filter of FIG. 8A and build it up in a pay-as-you-go manner as part of processing queries and updates. In contrast, a Bloom filter always requires a training phase upfront and this training phase involves scanning all the data of the cold store.

If a dedicated training phase is affordable, such a training phase is also beneficial for adaptive range filters. This way, the adaptive range filters can perform well from the very beginning. Specifically, adaptive range filters can be trained in the following way if such a training phase is affordable:

1) Explore the Data: A table in the cold store is scanned. From the results, a perfect adaptive range filter which accurately models all gaps in the cold store is constructed. Such a perfect adaptive range filter, for instance, would escalate Node [0,7] in FIG. 6 to capture that the cold store contains no keys that match 4 and 7. This adaptive range filter is likely to exceed the space budget, but that is typically tolerable in the training phase. (The adaptive range filter is trimmed to fit its space budget in step 3 below.)

2) Explore the Workload: A series of example queries and updates which are representative for the query and update workload are run. The purpose of this step is to make sure that the adaptive range filter learns the query/update distribution. As part of this step of the training phase, usage counters are kept at all the leaves of the perfect adaptive range filter indicating how often each leaf was involved in a query or update.

3) Meet Space Constraints: The adaptive range filter is trimmed by iteratively selecting the leaf with the lowest usage counter as a victim for replacement (as part of a de-escalation) until the adaptive range filter fits into the space budget. At this point, all of the usage counters are discarded and more space-efficient usage statistics such as used bits for a clock strategy or even no statistics at all are kept.

Note that this training process can be applied simultaneously to all adaptive range filters of a table (e.g., adaptive range filters that index the status, ship_date, etc. fields of an order table).

2.4.6 Summary and Variants

This section presented a series of techniques to train and adapt an adaptive range filter. A goal is to converge to an adaptive range filter that is small and whose shape reflects both the data and query distribution and has, thus, high precision with few false positives. Again, the rule of thumb is that an adaptive range filter is preferably coarse-grained (i.e., have leaves that cover large ranges) for empty and densely-populated regions or regions that are infrequently queried; in contrast, an adaptive range filter should preferably invest its bits and be fine-grained for regions that are frequently queried and have many gaps.

Figure 10:
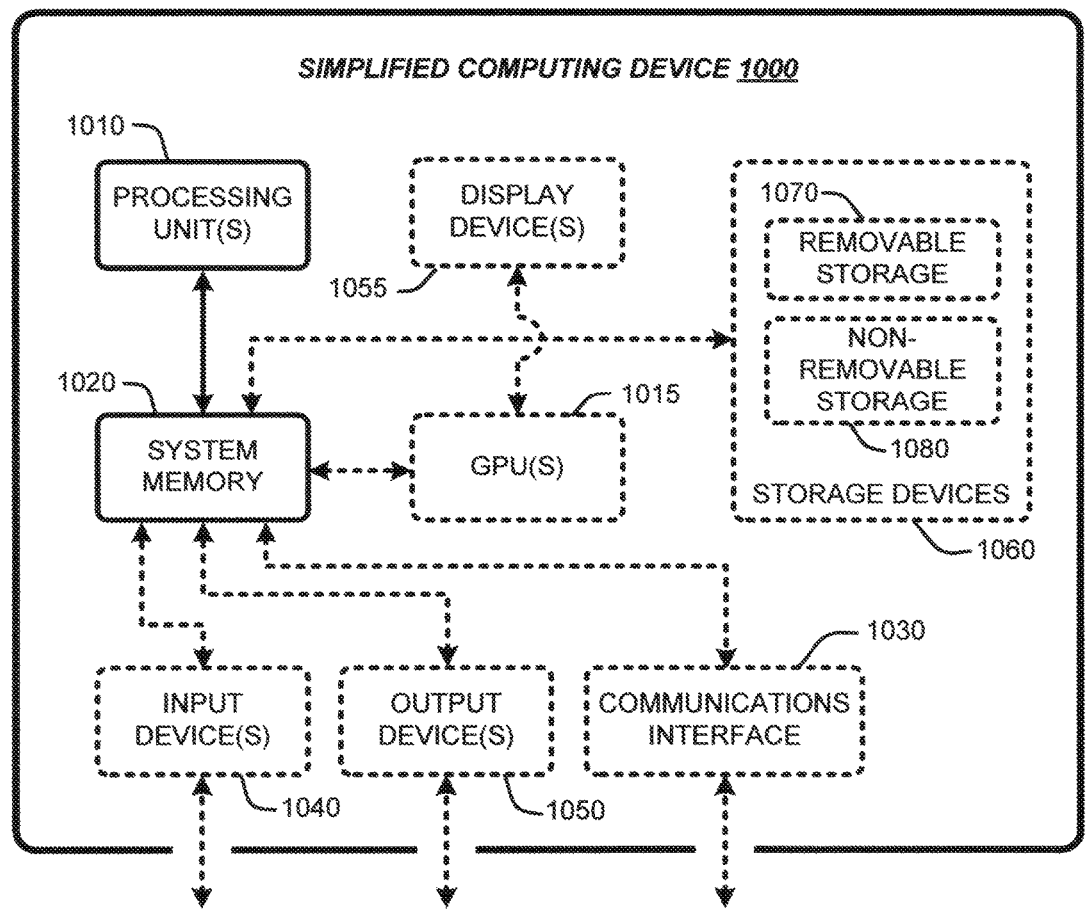
FIG. 10 is a schematic of an exemplary computing environment which can be used to practice the adaptive range filtering technique.

3.0 Exemplary Operating Environments:

The adaptive range filtering technique described herein is operational within numerous types of general purpose or special purpose computing system environments or configurations. FIG. 10 illustrates a simplified example of a general-purpose computer system on which various embodiments and elements of the adaptive range filtering technique, as described herein, may be implemented. It should be noted that any boxes that are represented by broken or dashed lines in FIG. 10 represent alternate embodiments of the simplified computing device, and that any or all of these alternate embodiments, as described below, may be used in combination with other alternate embodiments that are described throughout this document.

For example, FIG. 10 shows a general system diagram showing a simplified computing device 1000. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the adaptive range filtering technique, the device should have a sufficient computational capability and system memory to enable basic computational operations. In particular, as illustrated by FIG. 9, the computational capability is generally illustrated by one or more processing unit(s) 1010, and may also include one or more GPUs 1015, either or both in communication with system memory 1020. Note that that the processing unit(s) 1010 of the general computing device may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 10 may also include other components, such as, for example, a communications interface 1030. The simplified computing device of FIG. 10 may also include one or more conventional computer input devices 1040 (e.g., pointing devices, keyboards, audio input devices, video input devices, haptic input devices, devices for receiving wired or wireless data transmissions, etc.). The simplified computing device of FIG. 10 may also include other optional components, such as, for example, one or more conventional computer output devices 1050 (e.g., display device(s) 1055, audio output devices, video output devices, devices for transmitting wired or wireless data transmissions, etc.). Note that typical communications interfaces 1030, input devices 1040, output devices 1050, and storage devices 1060 for general-purpose computers are well known to those skilled in the art, and will not be described in detail herein.

The simplified computing device of FIG. 10 may also include a variety of computer readable media. Computer readable media can be any available media that can be accessed by computer 1000 via storage devices 1060 and includes both volatile and nonvolatile media that is either removable 1070 and/or non-removable 1080, for storage of information such as computer-readable or computer-executable instructions, data structures, program modules, or other data. Computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the adaptive range filtering technique described herein, or portions thereof, may be stored, received, transmitted, or read from any desired combination of computer or machine readable media or storage devices and communication media in the form of computer executable instructions or other data structures.

Finally, the adaptive range filtering technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process to summarize data, comprising:
    creating a trie-structure to index the data wherein:
        each node of the trie-structure represents a particular region of a domain of the data,
        a root node represents the whole domain of data to be indexed,
        each parent node fully contains the regions of its children in the trie-structure, and
        leaves of the trie-structure contain occupied bits indicating whether tuples in the set of data exist in the particular region of data.

2. The computer-implemented process of claim 1, further comprising:
    processing a query using the trie-structure by inspecting all leaf nodes that overlap with a range specified in the query;
    if the occupied bit of one of the leaf nodes is set then processing the query on the data set, otherwise deducing that the data set contains no relevant data for that query.

3. The computer-implemented process of claim 1 further comprising processing multiple queries using the trie-structure and using the results of processing the multiple queries to construct a trie of minimal size that results in no false positives for the multiple queries.

4. The computer-implemented process of claim 1 wherein the trie-structure is used to store subranges of a larger domain.

5. A system that determines whether or not to access stored data, comprising:
    a general purpose computing device;
    a computer program comprising program modules executable by the general purpose computing device, wherein the computing device is directed by the program modules of the computer program to,
    create an adaptive range filter structured as a trie wherein:
        each node of the trie represents a particular region of a domain of data and a root node represents the entire domain indexed,
        a parent node fully contains the regions of its children nodes in the trie,
        leaves of the trie contain occupied bits indicating whether tuples in the data exist in that particular region;
    process a query using the trie-structured adaptive range filter by inspecting all leaf nodes that overlap with the query;
    if the occupied bit of one of the leaf nodes is set then processing the query on the data set, otherwise deducing that the data set contains no relevant data for the query.

6. The system of claim 5, further comprising modules to:
    partition the data into a cold set of data that is infrequently accessed and a hot set of data that is frequently accessed;
    store the cold set of data in external memory of a computing device;
    store in main memory of the computing device the adaptive range filter that contains a compact summary of the contents of an external index for the cold set of data.

7. The system of claim 4, wherein the shape of the trie is determined by a sequence of split and merge operations, wherein:
    in a split operation a leaf node gets two new children nodes, each covering a different half of a region of the leaf, and wherein the occupied bits of the newly created children nodes are initialized to be the same as the occupied bit of their parent node before the parent node was split, and wherein
    in a merge operation two leaf nodes that have the same parent are removed and as a result their parent becomes a leaf and its occupied bit is set to the logical OR of the existence bits of its two children before they were removed.

8. The system of claim 7, wherein a clock replacement policy is used in the merge operation to determine which leaf nodes to merge.

9. The system of claim 7, wherein the trie automatically adapts to changes in query distribution and data distribution by merging nodes that are infrequently queried and by subdividing nodes that are frequently queried.

10. A computer-implemented process to access data, comprising:
    storing in memory of a computing device an adaptive range filter that contains a compact summary, in a trie format, of the contents of an index for a set of data, wherein:
        each node of the trie format represents a particular region of a domain of the data,
        a root node represents the whole domain of data to be indexed, each parent node fully contains the regions of its children in the trie-format, and leaves of the trie-format contain occupied bits indicating whether tuples in the set of data exist in the particular region of data;

receiving a query;

checking the adaptive range filter to determine if the index may contain records satisfying a predicate of the query, if the adaptive range filter indicates that the index contains no records satisfying the query predicate, not accessing the index or the set of data; and if the adaptive range filter indicates that the index contains records satisfying the query predicate, accessing the index and the set of data to retrieve data satisfying the query predicate.

11. The computer-implemented process of claim 10 wherein the adaptive range filter supports both range and equality predicates.

12. The computer-implemented process of claim 10 wherein the adaptive range filter formatted in the trie format summarizes data values contained in a range of data, wherein each node of the trie represents a particular region of data, the root node of the trie represents a whole domain indexed, a parent node fully contains the regions of data of its children, and leaves contain occupied bits indicating whether data in the set of data exists in a particular region.

13. The computer-implemented process of claim 12 wherein the domain of data is divided into sub-ranges and wherein for each sub-range an occupied bit is maintained that indicates for each sub-range whether the data set contains any data in that region and if the occupied bit of at least one overlapping sub-range is set to true, accessing the data set to answer the query.

14. The computer-implemented process of claim 10 wherein the adaptive range filter seeks to minimize the number of false positives returned in response to a query.

15. The computer-implemented process of claim 10 wherein the adaptive range filter further subdivides a particular region to make the adaptive range filter more fine grained in order to avoid false positives if the same query is asked again.

16. The computer implemented process of claim 12 wherein adjacent regions of the adaptive range filter are merged in order to reduce the size of the adaptive range filter.

17. The computer-implemented process of claim 10 wherein the adaptive range filter is updated based on false positives returned in response to one or more queries.

18. The computer-implemented process of claim 10 wherein the adaptive range filter is updated based on true positives returned in response to one or more queries.

19. The computer-implemented process of claim 12 wherein a trie of an adaptive range filter is encoded by:

encoding each non-leaf intermediate node of the trie in breadth first traversal using two bits to indicate whether that node has 0, 1 or 2 children nodes, and encoding the occupied bits of the leaves.

20. The computer-implemented process of claim 12 wherein the adaptive range filter is trained to adapt to changes in query distribution and data distribution, comprising:

using the set of data to create a perfect adaptive range filter which accurately models all gaps in the set of data;

running a series of queries to the data set to learn a query distribution and a data distribution while keeping usage counters indicating how often each leaf in the perfect adaptive range filter is involved in a query or update;

trimming the perfect adaptive range filter iteratively by selecting the leaf with the lowest usage counter as a victim for replacement until the adaptive range filter is a desired size.

* * * * *